Feb. 11, 1936.  G. M. PESTARINI  2,030,762
ELECTRICAL APPARATUS FOR THE TRANSMISSION OF ANGULAR MOVEMENTS
Filed Dec. 21, 1933
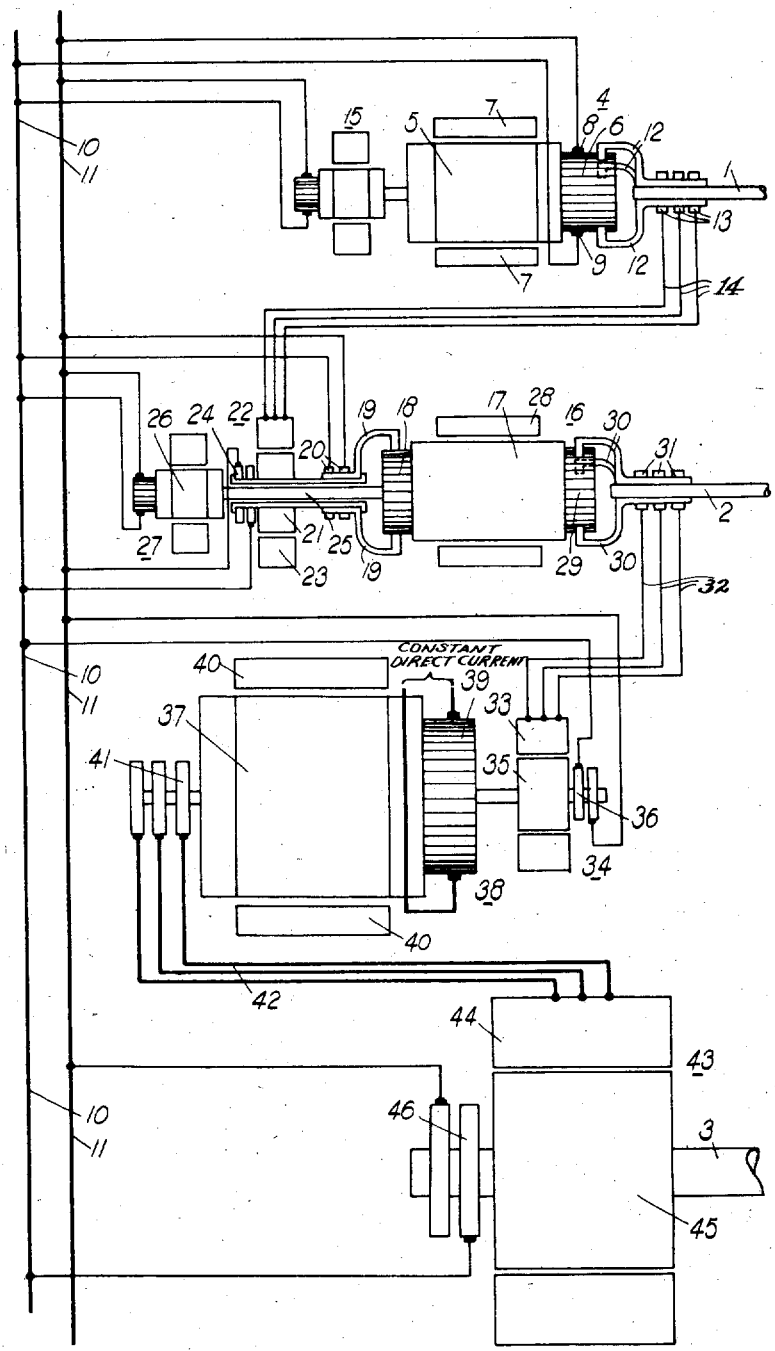
INVENTOR
GIUSEPPE M. PESTARINI
By
ATTORNEY Patented Feb. 11, 1936

2,030,762

UNITED STATES PATENT OFFICE 2,030,762

ELECTRICAL APPARATUS FOR THE TRANSMISSION OF ANGULAR MOVEMENTS

Giuseppe Massimo Pestarini, Sheffield, England

Application December 21, 1933, Serial No. 703,453
In Great Britain December 23, 1932

5 Claims. (Cl. 172—239)

This invention relates to the transmission of angular movements and has for its object to provide improved apparatus for the summation of the angular movements of two independent shafts and transmission of the same to cause movement of a third shaft.

Assuming there are three shafts mechanically independent of one another, the first of which is rotated through the angle $\alpha_1$, and the second of which is rotated through the angle $\alpha_2$, it is required that the third shaft should automatically be rotated through the angle $\beta+\alpha_1+\alpha_2$, the difference $\beta$ between the sum of the angular movements of the first two shafts and the movement of the third shaft increasing with the resisting torque which the third shaft is required to overcome, and further that the rotation of the third shaft should be zero when the resistant torque is zero and must not involve any modification of the torque on the first two shafts.

In one apparatus for achieving this end an ordinary dynamo with salient poles, which is separately excited and rotated at a constant speed, has associated with it a polyphase brush gear which is moved around the circumference of the commutator of the dynamo by the rotation of the first shaft. The dynamo is also provided with a set of fixed brushes on the commutator connected to a direct current supply of constant voltage. The second shaft is arranged to move a polyphase brush gear similar to that operated by the first shaft round the commutator of an electric machine having a polyphase stator and a rotor with an ordinary armature winding. The third shaft is driven by a synchronous motor having a polyphase stator which is supplied with current from the polyphase brush gear of the second machine, the polyphase brush gear of the first machine being connected to the polyphase stator of the second machine. This apparatus, hereinafter termed for convenience the "primitive solution" is satisfactory when the rate of change of the angular movements of the two shafts, namely $\alpha_1$ and $\alpha_2$ is zero, or very small, of the order of a few radians per second, or when this rate of change is large but the resisting torque of the third shaft which is to be driven is small, for example, of the order of grams x meters, but is not found satisfactory under other conditions when the rate of change of the angular movements of the first two shafts is not very small and the torque resisting movement of the third shaft is of the order of kilograms x meters. In such cases two difficulties may arise. In the first place the alternating voltage supplied to the synchronous motor remains practically constant when the rate of change increases and consequently the current supplied to the synchronous motor will decrease and will no longer suffice for developing the necessary torque when the resistant torque is large. In the second place commutation under the brushes becomes very difficult.

According to the present invention the difficulties arising with the primitive solution above outlined are avoided by using machines and apparatus as follows.

The first machine is a commutator dynamo electric machine driven at a constant speed, but has what is conveniently called an "inert" stator, that is to say a stator which is made of magnetic material such as solid or laminated iron but is not provided with exciting windings and therefore does not of itself induce a magnetic field. The rotor of the machine is excited by currents supplied through the commutator. The machine has additional polyphase brushes movable round the commutator of the machine in accordance with the angular movement of the first shaft by which polyphase currents are collected from the commutator.

A second commutator machine similar to that above described, the rotor of which is also driven at a constant speed, has an additional commutator with associated brushes rotated around said commutator by a synchronous motor driven by the currents supplied from the first mentioned machine, said brushes being connected to a source of direct current at constant voltage and supplying such current to the rotor windings. The polyphase brushes of the second machine are moved around the commutator in accordance with the angular movement of the second shaft.

The third shaft is driven by a synchronous motor to which current is supplied from a machine similar to the first above described, having its rotor excited by constant direct current supplied to brushes co-operating with the commutator, said rotor being driven by a synchronous motor supplied with current from the polyphase brushes of the second machine, and being further provided with slip rings and co-operating polyphase brushes from which current can be collected and supplied to the synchronous motor driving the third shaft as aforementioned.

The synchronous motors are provided with normal direct current constant voltage rotor excitation.

It will be observed that the stators of the first three machines in the arrangement above described are inert, that is to say they do not set up any magnetic field, but the machine in each case is a rotor excitation machine and the stator merely serves to form a good magnetic path for the field set up by the rotor. The first machine, like the second machine, may have its rotor driven by a small direct current motor supplied from a source of constant voltage, which may also supply current to the rotor of the first machines through the brushes co-operating with its commutators. The polyphase brushes of the first machine are mechanically connected to the first shaft and the polyphase brushes of the second machine are mechanically connected to the second shaft.

The accompanying drawing is an electrical diagram showing the preferred manner of carrying out the invention in practice.

Referring to the drawing, the three shafts mechanically independent of one another are shown at 1, 2, 3, respectively. The machine 4 associated with the first shaft 1 comprises a rotor 5 with an armature winding connected to a commutator 6 and a solid stator 7 without windings. The commutator has two brushes 8, 9 by which direct current can be supplied to the armature from a constant voltage source indicated by the conductors 10, 11. The commutator 6 is also provided with a system of polyphase brushes 12 shown, for example, as three in number, which are mounted on the shaft 1 so as to be rotatable therewith, and are connected to slip rings 13 by which currents can be collected from the commutator 6 and supplied to conductors 14. The rotor 5 is rotated by a direct current machine 15 supplied with energy through brushes and a commutator from the direct current conductors 10, 11.

Associated with the shaft 2 is a machine 16 very similar to the machine 4 having a rotor 17, with an armature winding connected to a commutator 18 by which direct current from the conductors 10, 11 can be supplied to the armature winding through brushes 19 and slip rings 20. The brushes 19 are carried on a shaft rotated by the rotor 21 of a synchronous machine 22. This machine has a stator 23 to which currents are supplied from the conductors 14. The rotor 21 is supplied with direct current from the conductors 10, 11 through slip rings 24. The shaft 25 carrying the rotor 17 of the machine 16 passes through the hollow shaft of the rotor 21, and has mounted thereon the rotor 26 of a direct current motor 27, which is supplied with energy from the conductors 10, 11 through a commutator and brushes in the ordinary way. The machine 16 has a solid inert stator 28 without windings. The rotor 17 of this machine is provided with a second commutator 29, having associated therewith polyphase brushes 30 mounted on the rotatable shaft 2, which also carries slip rings 31 by which current collected from the commutator 29 by the brushes 30 can be supplied to the conductors 32.

The currents flowing in the conductors 32 are supplied to the stator 33 of a synchronous machine 34, the rotor 35 of which is supplied with direct current through slip rings 36 and brushes connected to the conductors 10, 11. Mounted on the same shaft as the rotor 35, and adapted to be rotated thereby is the rotor 37 of a machine 38, which is supplied with direct current of constant strength through a commutator 39 and associated brushes from a circuit not shown, and has an inert stator 40. The winding of the rotor 37 is also connected to polyphase slip rings 41 by which current is supplied from said rotor to conductors 42.

Associated with the shaft 3 is a synchronous machine 43 the stator 44 of which is supplied with current from the conductors 42 and the rotor 45 of which is provided with slip rings 46 and supplied with direct current from the conductors 10, 11.

In operation if the shaft 1 is rotated through an angle $\alpha_1$, the currents collected by the brushes 12 from the commutator 6 will induce in the rotor 5 the necessary flux for counterbalancing the direct current voltage which is supplied to the commutator through the brushes 8, 9. As the stator 23 of the synchronous machine 22 is supplied with currents from the brushes 12 through the conductors 14 the rotor 21 of the said synchronous machine will consequently be rotated through the angle $\alpha_1$, subject to a small difference which is, however, practically negligible in view of the small resistance of the said machine 22. The brushes 19 which rotate with the rotor 21 will also be rotated through the angle $\alpha_1$. If, now, the shaft 2 is turned through an angle $\alpha_2$ simultaneously with the rotation of the shaft 1 then the currents collected by the brushes 30 create the necessary flux in the rotor 17 for counterbalancing the voltage of the direct current supplied to said rotor through the brushes 19. The currents collected by the brushes 30 will be transmitted through the slip rings 31 to the conductors 32 and then supplied to the stator 33 of the synchronous machine 34. The rotor 35 of this machine will therefore turn through the angle $\alpha_1+\alpha_2$ subject to a difference, which is very small owing to the fact that the machine 38, the rotor 37 of which is driven by the machine 34, has no torque, like the machines 4 and 16. Direct current of constant strength supplied to the rotor 37 of the machine 38 through its commutator 39 will create in said rotor a constant magnetic flux which induces polyphase current in the windings of said rotor the frequency of which corresponds to the angular velocity of the synchronous motor 34 which drives said rotor 37. These currents are collected through the slip rings 41 and supplied through the conductors 42 to the stator 44 of the synchronous motor 43 which drives the shaft 3, and this shaft will therefore be caused to rotate through an angle which is equal to $\alpha_1+\alpha_2+\beta$, $\beta$ being the difference which is zero when the load on the shaft 3 is zero, and is otherwise a function which increases with the load on said shaft 3.

It will be understood that instead of causing the synchronous motor 43, which drives the shaft 3, to rotate through the angle $\alpha_1+\alpha_2$, it could be arranged to rotate through the angle $\alpha_1-\alpha_2$, by varying the direction of rotation of the synchronous motor 22, which rotates the direct current brushes 19. Furthermore provision may be made for rotating the shaft 3 through an angle equal to $k\alpha_1+k'\alpha_2$, $k$ and $k'$ being constants depending upon the ratios of the number of poles of the machines 22 and 34.

The invention may be applied to more than three shafts, for example in the case of N shafts the synchronous motor driving the Nth shaft which is required to rotate through an angle $$\sum_{i=1}^{i=N} k_i \alpha_i$$

where $k_1\ k_2\ k_3\ \ldots\ k_i\ \ldots\ k_N$ are arbitrary constants and $\alpha_1\ \alpha_2\ \ldots\ \alpha_i\ \ldots\ \alpha_N$ are the angles of displacement between the angles of rotation pertaining to the first, second . . . Nth shaft respectively.

I claim:

1. Equipment for transmission of a sum of angular movements with amplification of the transmitted power comprising transmitting apparatus, amplifying apparatus, and receiving apparatus electrically connected together, the transmitting apparatus comprising a plurality of electric machines, one machine for each angular movement, each unit comprising a rotor with winding and commutator, driven at a substantially constant speed, and a stator merely affording a path for the flux created by the rotor ampere turns, the commutator of the machine being associated with two sets of brushes, one set, called primary, carrying direct current at constant voltage, and the other set, called secondary, collecting a polyphase current, the primary set being rotated at an angular speed which is the sum of the angular speed corresponding to the preceding units, and the secondary set being rotated at the angular speed corresponding to the actual unit, the amplifying apparatus comprising a machine having a rotor with a winding connected to a commutator and to a set of slip rings as the rotor of a rotary converter and having a stator merely affording a path for the flux created by the rotor ampere-turns, its commutator being associated with a set of brushes carrying a direct current of constant intensity supplied by an adequate source, the angular speed of the said set of brushes with respect to the rotor being equal or proportional to the sum of the angular speed of the given movements, the amplifier supplying by its slip rings a polyphase current to the receiving apparatus which is a polyphase motor.

2. Equipment for transmission of a sum of angular movements as described in claim 1, and where each unit of the transmitting apparatus has its set of primary brushes driven by a small synchronous motor fed by the polyphase current supplied by the secondary set of brushes of the preceding unit, and where the angular speed between the set of brushes carrying direct current of constant intensity, and the associated commutator is obtained by means of a synchronous motor fed by the polyphase currents supplied by the secondary set of brushes of the last unit of the transmitting apparatus.

3. Equipment for transmission of a sum of angular movements, comprising transmitting apparatus and receiving apparatus electrically connected together, the transmitting apparatus comprising a plurality of electrical machines, one machine for each angular movement, each unit comprising a rotor with winding and commutator, driven at substantially constant speed, and a stator merely affording a path for the flux created by the rotor ampere turns, the commutator of the machine being associated with two sets of brushes, one set, called primary, carrying direct current at constant voltage, and the other set, called secondary, collecting a polyphase current, the primary set being rotated at an angular speed which is the sum of the angular speed corresponding to the preceding units, and the secondary set being rotated at the angular speed corresponding to the actual unit, and supplying polyphase current to the receiving apparatus.

4. Equipment for the transmission of a sum of angular movements with amplification of the transmitted power, comprising transmitting apparatus, amplifying apparatus, and receiving apparatus electrically connected together, the transmitting apparatus comprising a plurality of electric machines, one machine for each angular movement, each unit comprising a rotor with winding and commutator, driven at substantially constant speed, and a stator merely affording a path for the flux created by the rotor ampere turns, the commutator of the machine being associated with two sets of brushes, one set, called primary, carrying direct current at constant voltage, and the other set, called secondary, collecting a polyphase current, the primary set being rotated at an angular speed which is the sum of the angular speed corresponding to the preceding units, and the secondary set being rotated at an angular speed corresponding to the actual unit and supplying polyphase current to the amplifying apparatus supplying the receiving apparatus.

5. Equipment for transmission of a sum of angular movements with amplification of the transmitted power comprising transmitting apparatus, amplifying apparatus, and receiving apparatus electrically connected together, the transmitting apparatus supplying the amplifying apparatus, which comprises a machine having a rotor with a winding connected to a commutator and to a set of slip rings as the rotor of a rotary converter and having a stator merely affording a path to the flux created by the rotor ampere-turns, its commutator being associated with a set of brushes carrying a direct current of constant intensity supplied by an adequate source, the angular speed of the said set of brushes with respect to the rotor being equal or proportional to the sum of the angular speed of the given movements, the amplifier supplying by its slip rings a polyphase current to the receiving apparatus which is a polyphase motor.

GIUSEPPE MASSIMO PESTARINI.